US008977311B2

(12) United States Patent
Osterling et al.

(10) Patent No.: US 8,977,311 B2
(45) Date of Patent: Mar. 10, 2015

(54) METHOD AND ARRANGEMENT FOR REDUCING INTERFERENCE IN A WIRELESS COMMUNICATION NETWORK

(75) Inventors: Jacob Osterling, Jarfalla (SE); Franz Heiser, Jarfalla (SE); Gunnar Peters, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 587 days.

(21) Appl. No.: 12/921,480

(22) PCT Filed: Apr. 4, 2008

(86) PCT No.: PCT/SE2008/050393
§ 371 (c)(1), (2), (4) Date: Sep. 8, 2010

(87) PCT Pub. No.: WO2009/123515
PCT Pub. Date: Oct. 8, 2009

(65) Prior Publication Data
US 2011/0009157 A1 Jan. 13, 2011

(51) Int. Cl.
*H04B 7/00* (2006.01)
*H04B 17/00* (2006.01)
(Continued)

(52) U.S. Cl.
CPC ............ *H04B 17/004* (2013.01); *H04L 1/0001* (2013.01); *H04W 28/18* (2013.01); *H04W 52/223* (2013.01); *H04B 17/005* (2013.01); *H04B 17/0075* (2013.01); *H04B 17/0077* (2013.01); *H04L 1/0003* (2013.01); *H04L 1/0009* (2013.01); *H04L 1/0026* (2013.01); *H04W 24/10* (2013.01); *H04W 52/242* (2013.01); *H04W 52/243* (2013.01); *H04W 72/0426* (2013.01);
(Continued)

(58) Field of Classification Search
None
See application file for complete search history.

(56) References Cited

U.S. PATENT DOCUMENTS

2004/0110510 A1* 6/2004 Jeon et al. ............... 455/450
2005/0096061 A1* 5/2005 Ji et al. ................... 455/450
(Continued)

FOREIGN PATENT DOCUMENTS

| WO | WO 01/91322 | 11/2001 |
|---|---|---|
| WO | WO 2004/042982 | 5/2004 |
| WO | WO 2006/077450 | 7/2006 |

OTHER PUBLICATIONS

International Search Report for PCT/SE2008/050393, mailed Mar. 2, 2009.
Sahin et al., "Predictive scheduling in multi-carrier wireless networks with link adaptation", Vehicular Technology Conference, vol. 7, (2004), pp. 5015-5020.
3GPP TSG RAN WG1#42, IPWIRELESS: "EU-TDD: Intercell Interference Control by Scheduling and Text Proposal for TR 25.826," Tdoc R1-050868, Aug. 25, 2005.
3GPP TSG-RAN WG1 #50, LG Electronics: "Intra-Cell Power Control for Uplink in E-UTRA," R1-073506, Aug. 15, 2007.
Supplementary European Search Report issued in Application No. EP 08 74 1883 dated May 23, 2014.

*Primary Examiner* — Yuwen Pan
*Assistant Examiner* — Fanghwa Wang

(57) ABSTRACT

The present invention relates to a method and arrangement for reducing interference in a cellular communication network. A radio base station of the network is configured to serve at least a first cell, where interference is reduced by selecting a link adaptation scheme for a UE in the first cell, The arrangement comprises means for receiving measurements on estimated channel quality, means for estimating channel quality for a future transmission by adjusting the received measurements on estimated channel quality based on knowledge of future UE scheduling in at least the first cell, and means for selecting the link adaptation scheme comprising a transmit power level based on the estimated channel quality for the future transmission.

23 Claims, 7 Drawing Sheets

(51) Int. Cl.
*H04L 1/00* (2006.01)
*H04W 28/18* (2009.01)
*H04W 52/22* (2009.01)
*H04W 24/10* (2009.01)
*H04W 52/24* (2009.01)
*H04W 72/04* (2009.01)
*H04W 72/08* (2009.01)
*H04W 84/04* (2009.01)

(52) U.S. Cl.
CPC .......... *H04W 72/082* (2013.01); *H04W 84/042* (2013.01)

USPC ............... 455/522; 455/114.2; 455/278.1; 455/296; 455/63.1; 455/343.4

(56) References Cited

U.S. PATENT DOCUMENTS

| | | | |
|---|---|---|---|
| 2005/0099973 A1* | 5/2005 | Qiu et al. | 370/328 |
| 2007/0232314 A1* | 10/2007 | Kolding et al. | 455/436 |
| 2007/0298822 A1 | 12/2007 | Wan et al. | |
| 2009/0196193 A1 | 8/2009 | Frenger et al. | |

* cited by examiner

Cell A

| PRB | RBS power | Scheduled Ues (noise margin) |
|---|---|---|
| 0-32 | 20dBm | UE1(-100dBm) |
| 33-65 | 18dBm | UE2(-95dBm) |
| 66-99 | 22dBm | |

Fig. 3a

| UE1 (cellA) | CELL A | CELL B | CELL C |
|---|---|---|---|
| PRB | | | |
| 0-32 | 100dB | 140dB | 150dB |
| 33-65 | 95dB | 140dB | 150dB |
| 66-69 | 90dB | 140dB | 150dB |

Fig. 3b

METHOD AND ARRANGEMENT FOR REDUCING INTERFERENCE IN A WIRELESS COMMUNICATION NETWORK

This application is the U.S. national phase of International Application No. PCT/SE2008/050393 filed 4 Apr. 2008, which designated the U.S., the entire contents of which is hereby incorporated by reference.

TECHNICAL FIELD

The present invention relates to a method and arrangement in a wireless communication network. In particular, it relates to a method and arrangement for mitigating interference.

BACKGROUND

In packet based wireless communications networks, it is very important to have a good estimate of the interference level to perform link adaptation. Link adaptation implies to determine at least one of modulation, coding, power and Multiple Input Multiple Output (MIMO) setting, that is/are adapted to the current transmission situation.

The interference is caused by uncoordinated transmissions. This uncoordinated transmission may be caused by other radio base stations or by transmissions controlled by the own radio base station.

An example of such packet based wireless communications networks is Long Term Evolution (LTE) networks. The LTE networks are standardized by 3GPP Long Term Evolution (LTE) which is a project within the 3rd Generation Partnership Project (3GPP) to improve the Universal Mobile Telecommunication System (UMTS) standard with High Speed Packet Access functionality to cope with future requirements in terms of improved services such as higher data rates, improved efficiency, lowered costs etc.

A wireless communication network comprises typically user equipments (UE) 120 wirelessly connected to radio base stations 110 as illustrated in FIG. 1. The radio network architecture may vary between one technology to another. In the LTE, the radio base stations 110 are directly connected to the core network (CN) 100, which is adapted to interconnect the cellular telecommunication system to other systems. In addition, the radio base stations are also connected to each other primarily for exchanging signalling information.

In the existing networks, the link adaptation is performed based on reported and measured CQI (Channel Quality Indicators), and reported and measured received power level, in order to adapt the transmission to the current interference situation. The CQI reports comprise an indication of the signal to noise plus the interference ratio of the reference symbols over the frequency range. In the downlink (DL), the UE measures on predetermined reference signals and reports CQI and power measurements, and provides information on how the channel quality differs over the frequency band. In the uplink (UL), the radio base station measures the quality of the received signal. If the UE also recently has used other parts of the frequency band, a certain awareness of the frequency dependency may be available to the radio base station.

The CQI reports and the received signal level reports are then used to determine the suitable modulation, coding, power and MIMO setting, which is referred to as link adaptation. The link adaptation is done for one UE at a time, and repeated for each sub frame. In LTE networks the subframe is 1 ms.

The channel quality for a certain UE is calculated from the path loss, expected transmit power and experienced interference for this UE. Since the interference for one UE is partially caused by transmissions to and from other UEs, the interference experienced in the past will not be the same as the interference present in the scheduled time frame.

In some situations when a UE is located on or close to the cell border of a first cell and hence experiences poor channel conditions, the UE is very sensitive to interference e.g. caused by other UEs in adjacent cells (UL) or by the radio base station covering adjacent cells to the first cell. Therefore, it is important to have a good knowledge of the interference level for the interference sensitive UE when allocating power in adjacent cells.

SUMMARY

The object of the present invention is thus to be able to increase the network capacity while controlling the interference to scheduled UEs.

According to a first aspect of the present invention, a method for reducing interference in a cellular communication network is provided. The cellular communication network comprises a radio base station configured to serve at least a first cell, where interference is reduced by selecting a link adaptation scheme for a UE in the first cell. In the method measurements on estimated channel quality is received. The channel quality for a future transmission is then estimated by adjusting the received measurements on estimated channel quality based on knowledge of future UE scheduling in at least the first cell. Accordingly, the link adaptation scheme comprising a transmit power level is selected based on the estimated channel quality for a future transmission.

According to a second aspect of the present invention, an arrangement for reducing interference in a cellular communication network is provided. The cellular network comprises a radio base station configured to serve at least a first cell, where interference is reduced by selecting a link adaptation scheme for a UE in the first cell. The arrangement comprises means for receiving measurements on estimated channel quality and means for estimating channel quality for a future transmission by adjusting the received measurements on estimated channel quality based on knowledge of future UE scheduling in at least the first cell. Moreover, the arrangement comprises means for selecting the link adaptation scheme comprising a transmit power level based on the estimated channel quality for a future transmission.

According to an embodiment, the radio base station is further configured to serve at least a second cell and the channel quality for a future transmission is estimated by adjusting the received measurements on estimated channel quality based on knowledge of future UE scheduling in at least the first cell and the second cell.

According to a further embodiment, a noise margin is introduced such that sequential link adaptation can be performed. Based on the selected link adaptation scheme a noise margin is determined. The noise margin is indicative of how much noise the receiver is allowed to experience in order to be able to keep the selected link adaptation scheme for each scheduled UE. The estimation of channel quality for a future transmission comprises determination of disturbance caused by transmission in at least the second cell, and determination of disturbance caused by transmission in the first cell by other transmitters within the first cell. The selected transmit power further is used for sequential link adaptation of other transmissions, wherein the noise margin of the link adaptation is used as an upper boundary for the sequential link adaptation of the other transmissions. The noise margin is updated accordingly when further transmissions are scheduled.

An advantage with embodiments of the present invention is that an improved selection of power setting, modulation, and coding is possible which leads to less retransmissions, resulting in higher system capacity and lower latencies. This in turn results in improved user experience.

A further advantage is that embodiments of the present invention provide support for non-synchronized uplink and Multi-User MIMO.

A yet further advantage with embodiments of the invention is that the calculated noise margin minimizes the number of calculations.

A yet further advantage with embodiments of the invention is that fewer timing advance messages need to be transmitted as the system is more robust towards bad timing advance.

BRIEF DESCRIPTION OF THE DRAWINGS

The invention will in the following be described in more detail with reference to enclosed drawings, wherein:

FIG. 3a illustrates a cell table according to an embodiment of the present invention and FIG. 3b illustrates a UE table according to an embodiment of the present invention.

DETAILED DESCRIPTION

In the following description, for purposes of explanation and not limitation, specific details are set forth, such as particular sequences of steps, signalling protocols and device configurations in order to provide a thorough understanding of the present invention. It will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Figure 1:
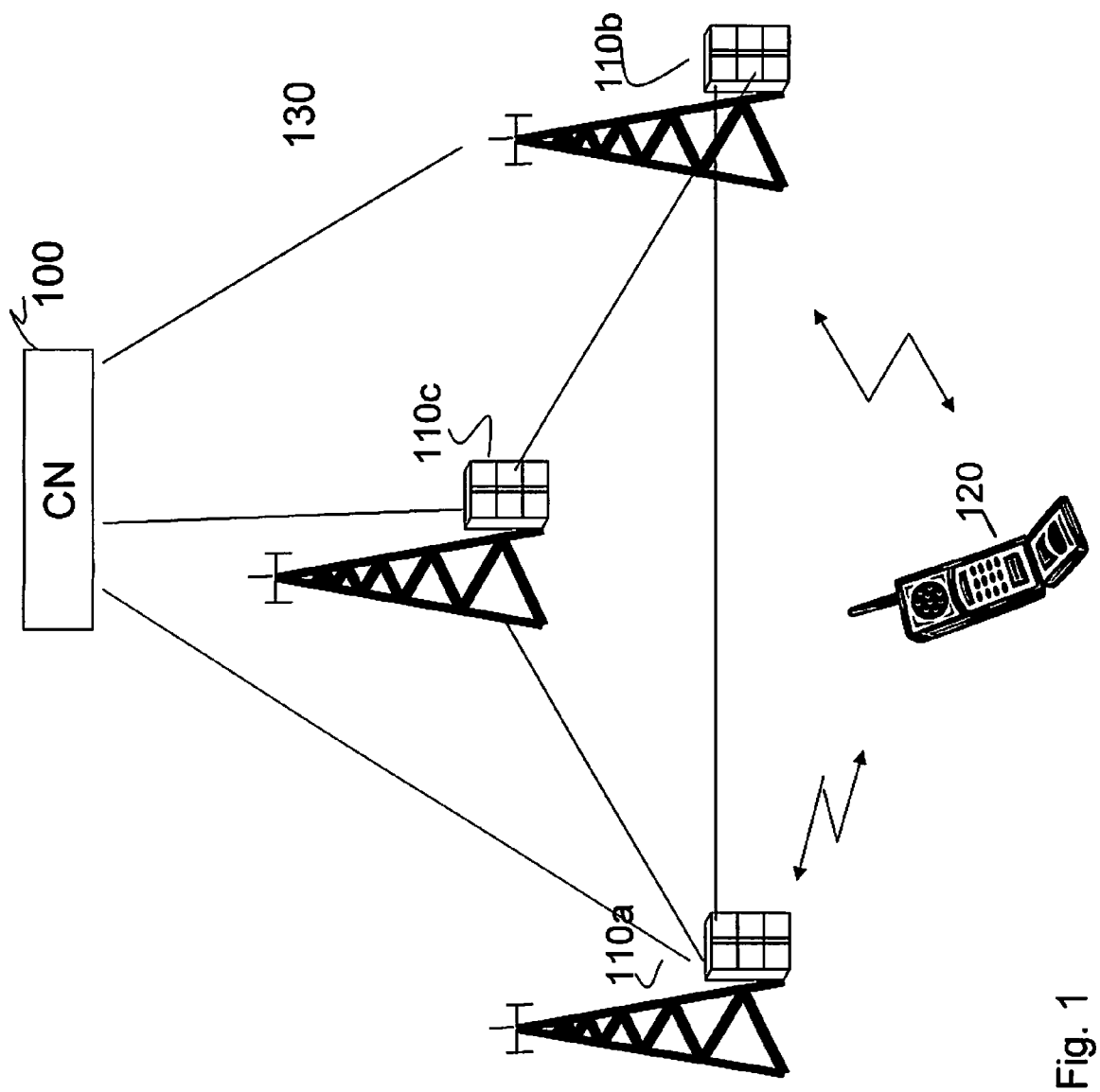
FIG. 1 illustrates schematically a wireless communication network wherein the present invention may be implemented.
Figure 2:
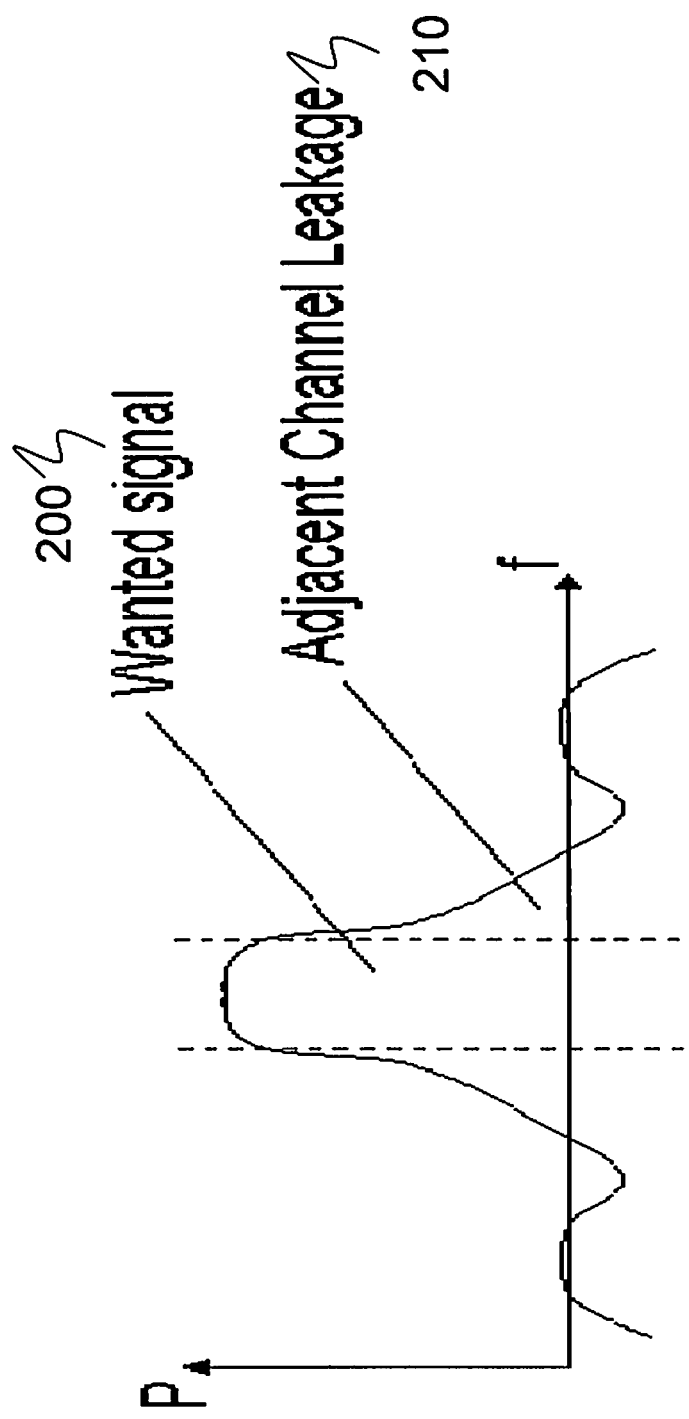
FIG. 2 illustrates adjacent channel leakage according to prior art.

As mentioned above, the interference for one UE is partially caused by the transmissions to and from other UEs and hence the interference experienced in the past will not be the same as the interference present in the scheduled time frame. Furthermore, the interference will also depend on the difference in scheduling of UEs by one radio base station between the time of measurement and the time of scheduling. This type of intra radio base station interference could be caused by, e.g., that the UE transmitter has rather high Adjacent Channel Leakage. I.e. if the UE is asked to transmit on portions of the frequency band 200, it will also transmit disturbances on the adjacent parts 210 as illustrated in FIG. 2.

The intra radio base station interference may also depend on that a UE with unknown time alignment can cause disturbance on a subsequent time slot. Moreover, the cells served by one radio base station are usually overlapping which results in that the downlink (DL) transmission in one cell causes disturbances in the other cells of the same radio base station. The characteristics of the disturbance depends on the beam forming which is being used.

In accordance with the present invention, at the time of scheduling UEs for a certain TTI (Transmit Time Interval) the link adaptation for a certain UE, i.e. the choice of modulation, coding, frequency allocation and power, takes the interference generated by the other UEs scheduled in the same TN into account.

Thus, the above stated objective problem is achieved by using knowledge of the UE scheduler when calculating the interference for future transmissions. Each radio base station is associated with a UE scheduler which is configured to schedule the UEs in the cells that the radio base station serves. Since the scheduling related to the own radio base station both at the time of measurement and at the time for scheduling are known, the CQI can be corrected accordingly. An initial interference measure is used for calculating a CQI value, but the initial interference measure is then adjusted by taking into account the knowledge about how the scheduler has allocated power and frequency resources of either the UEs for the uplink or the radio base station for the downlink in the own radio base station. An improved CQI value can then be provided.

I.e. the reported CQI value which is a measure of Signal/(Noise+Interference_old) is corrected by first estimating the Interference_old and then by estimating the Signal/(Noise+Interference_new), where the Interference_new takes into account the interference caused by the UEs that are about to be scheduled which the radio base station scheduler is aware of. In addition to this, a target noise margin may be added to minimize the risk of need for re-running the link adaptation.

A method and arrangements for reducing interference in a cellular communication network is provided. The cellular communication network comprises at least one radio base station configured to serve at least a first cell, where interference is reduced by selecting a link adaptation scheme link adaptation scheme comprising coding rate, modulation, transmit power and MIMO mode for a UE in the first cell. Measurements on estimated channel quality (CQI reports) are received and a channel quality for a future transmission is estimated by adjusting the received measurements on estimated channel quality based on knowledge of future UE scheduling in at least the first cell. The link adaptation scheme is then selected based on the estimated channel quality for future transmissions. Thus by utilizing the knowledge of which UEs that are scheduled it is possible to determine the interference for future transmissions implying that a more suitable link adaptation scheme can be selected.

Moreover, the interference in the surrounding cells to the cell A may be taken into account when estimating channel quality for a future transmission. For instance, an estimate of the average noise level from the neighbouring cells can be used as a default target noise margin.

It should be noted that the method and arrangement are applicable for both uplink and downlink.

Figure 6:
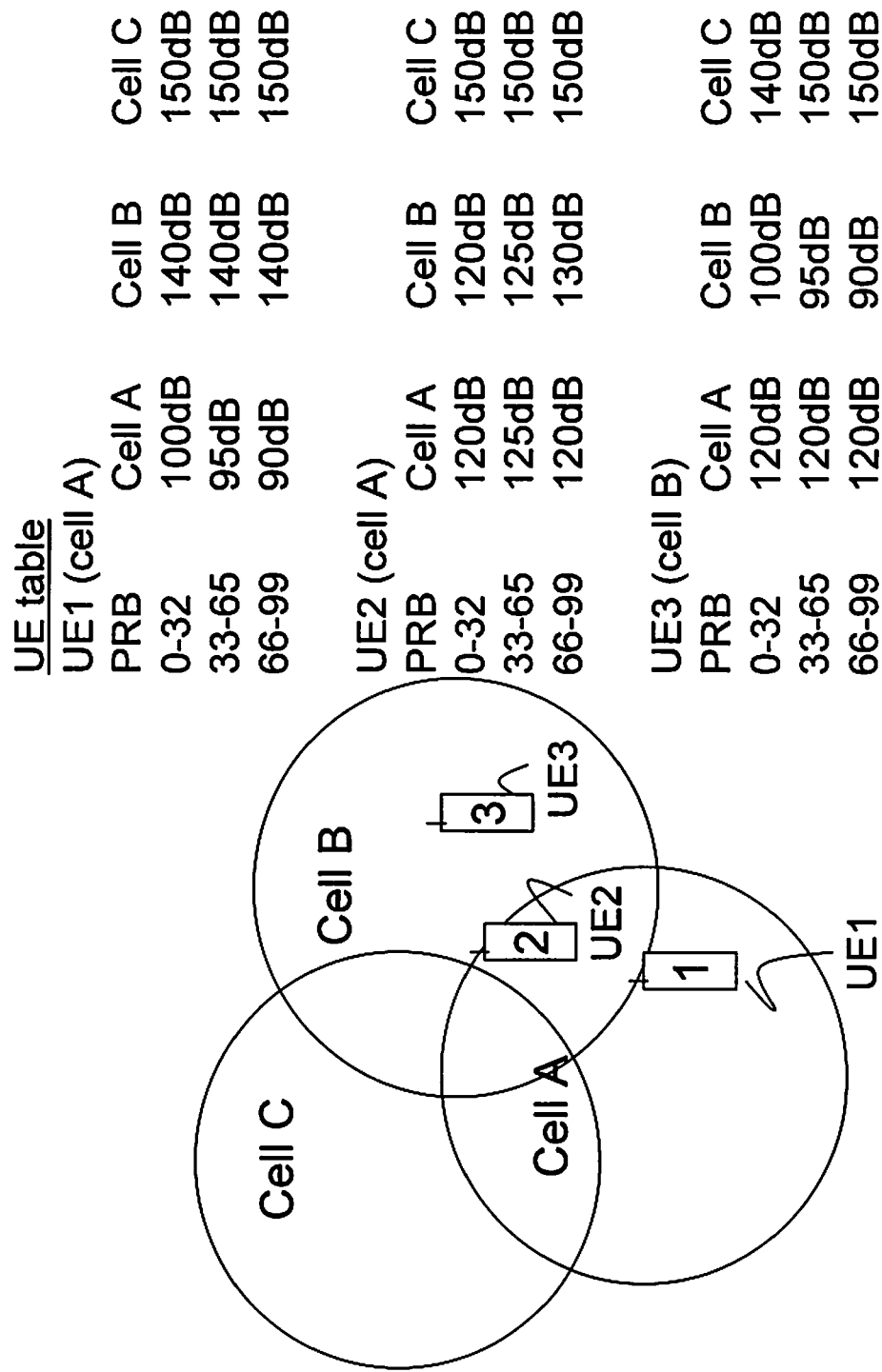
FIG. 6 illustrates an example scenario wherein embodiments of the present invention can be used.

To further improve the interference mitigation a noise margin is determined based on the selected link adaptation scheme. The noise margin indicates how much noise a UE is allowed to experience in order to be able to keep the selected link adaptation scheme. The noise margin will now described by the following scenario with one radio base station serving three cells; cell A, cell B and cell C which is illustrated by FIG. 6. When a UE 2 in cell A is located close to the cell border the UE 2 may be very sensitive to interference, which implies that a power increase in the adjacent cell B and cell C may result in that the UE 2 experiences an interference level which is too high for the current link adaptation.

Thus, it is desired to be able to increase the network capacity without disturbing UEs in adjacent cells and in particular UEs in adjacent cells which are already experience poor channel conditions.

Hence, an embodiment of the present invention concerns the scenario above. The interference is reduced by selecting a link adaptation scheme for a UE (UE2) in the first cell (cell A). The link adaptation scheme comprises coding rate, modulation, transmit power and MIMO mode. Measurements on the estimated channel quality is received, e.g. by receiving a parameter denoted the Channel Quality Indicator (CQI). Then, a channel quality for a future transmission is estimated based on knowledge of scheduled UEs and a link adaptation scheme (including transmit power level as stated above) is selected based on the estimated future channel quality as described above.

The noise margin indicative of how much noise a UE is allowed to experience in order to be able to keep the selected link adaptation scheme is then determined for each scheduled UE based on the selected link adaptation scheme.

The estimation of the channel quality for a future transmission is achieved in accordance with the present invention by determining the disturbance caused by transmission in at least the second cell (cell B), and determining disturbance caused by transmission in the first cell by other transmitters within the first cell (cell A). Furthermore, the selected transmit power level (included in the link adaptation scheme) is used for sequential link adaptation of other transmissions wherein the noise margin is used as an upper boundary for said sequential link adaptation of the other transmissions.

In order to reduce the downlink interference, a cell table for cell A is maintained per physical resource block (PRB) comprising radio base station power, noise margin for the scheduled UEs and identities of the scheduled UEs as illustrated in FIG. 3a. It should be noted that a physical resource block is a physical resource on which data and control information can be transmitted. For example a physical resource block may comprise of a number of frequencies used during a limited time period. In addition a UE table for each UE in cell A is maintained per resource block comprising the path loss from cell B and, if applicable, the path loss from other adjacent cells as illustrated in FIG. 3b.

Figure 4:
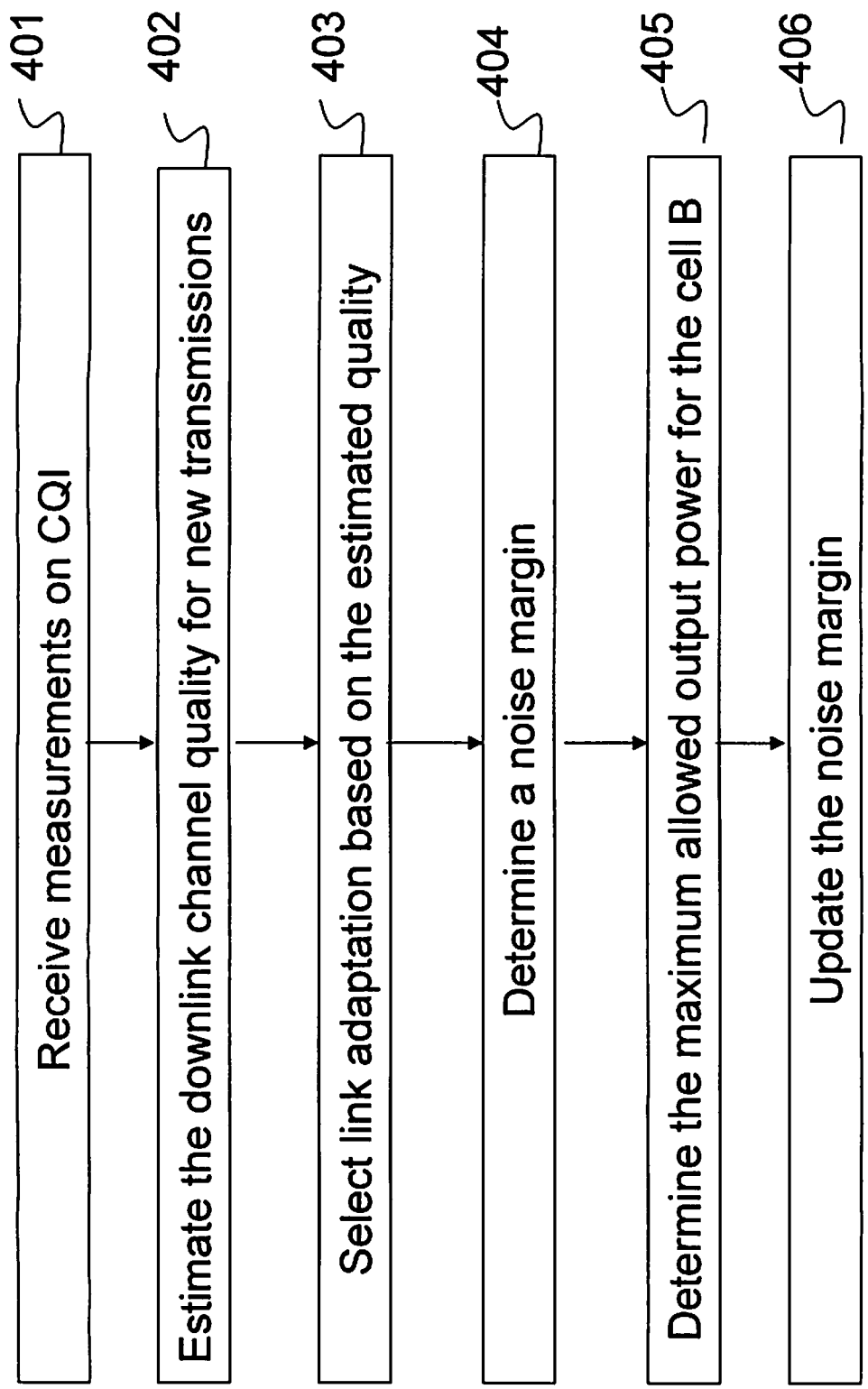
FIG. 4 is a flowchart of a method according to one embodiment of the present invention.

Accordingly, for the downlink, the following steps are performed to reduce the downlink interference. This is illustrated in the flowchart of FIG. 4.

401. Receive measurements on estimated downlink channel quality (e.g. the CQI).

402. Estimate the downlink channel quality for new transmissions.

403. Select link adaptation based on the estimated quality.

404. Determine based on the selected link adaptation scheme a noise margin indicative of how much noise a UE is allowed to experience in order to be able to keep the selected link adaptation scheme for each scheduled UE in the downlink direction. The noise margin can either be expressed as an absolute acceptable additional noise level or as a relative value to a target noise level.

According to an embodiment, step 402 further comprises steps 402a and 402b.

402a. Determine the disturbance in cell A caused by transmissions in cell B and cell C.

402b. Determine the disturbance in cell A caused by transmissions in cell A by other transmitters within cell A.

405. When scheduling a UE in cell B, the radio base station is configured to check the noise margin in cell A (from the cell table) and to add the path loss (from the UE table) in order to determine the maximum allowed output power for the cell B.

406. Once the maximum output power is decided according to the selected link adaptation scheme, the radio base station decreases the noise margin for the UEs in the cell A, in the cell table, correspondingly. If a further UE in a further cell, denoted cell C, later is scheduled, it will then use the updated noise margin value.

In order to reduce the uplink interference, each cell has per physical resource block (PRB) a table of input interference and noise margin and each UE in cell A has per PRB a table of pathloss to each of the other relevant cells, e.g. cell B. The input interference table indicates the amount of received power in each PRB by other UEs scheduled to transmit in that subframe. The noise margin table indicates the amount of additional input interference the receiver is capable to tolerate in that PRB without the link adaptation for the UE using that PRB becoming non-optimal.

Figure 5:
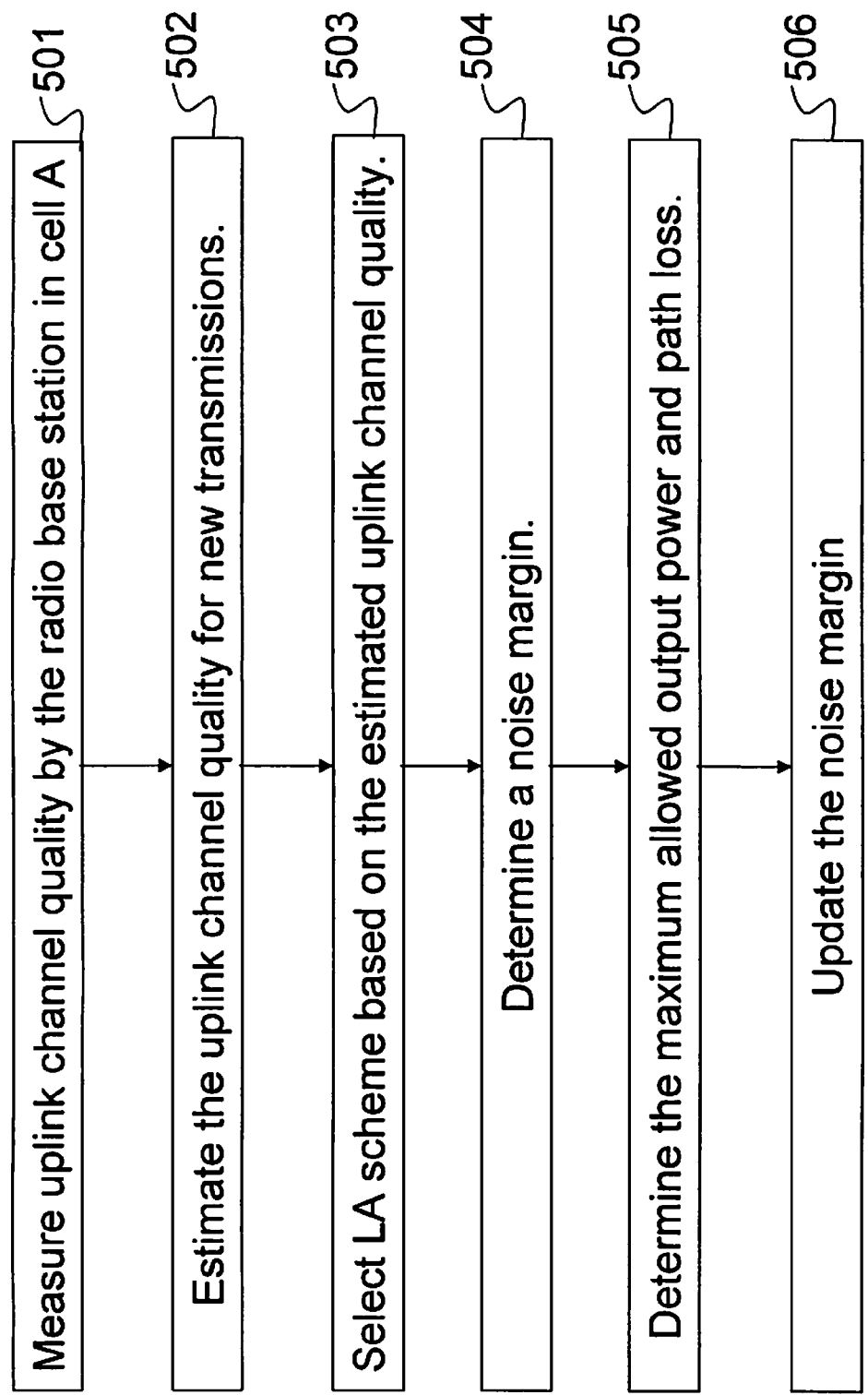
FIG. 5 is a flowchart of a method according to one embodiment of the present invention.

For the uplink, the following steps are performed to reduce the uplink interference. This is illustrated in the flowchart of FIG. 5.

501. Measure uplink channel quality by the radio base station in cell A.

502. Estimate the uplink channel quality for new transmissions.

503. Select link adaptation scheme comprising a transmit power based on the estimated uplink channel quality.

504. Determine based on the selected link adaptation scheme, a noise margin.

According to an embodiment of the present invention, step 502 comprises the further step of 502a.

502a. Determine how much interference already scheduled UEs (of cell A and of other cells) are causing in cell A.

505. Determine the maximum allowed output power for each PRB allocated for the first UE (UE A), based on the noise margin, in each of the surrounding cells (cell B), and the path loss from the first UE (UE A) to each of those surrounding cells (cell B).

506. Update the noise margin based on the selected output power.

It should be noted that the link adaptation scheme is selected based on the reported CQI. Subsequently, the noise margin is determined from a link adaptation-graph where the link adaptation scheme curves are plotted against channel quality and bit rate.

If the transmission power limitation caused by the noise margin in a neighbouring cell results in that no suitable link adaptation scheme is being found, either another UE is selected for scheduling, or the UE in the disturbed cells reruns its link adaptation with another target noise margin.

By maintaining this cell specific table for e.g. cell A it is possible for the radio base station to know how much, and on which frequencies the power can be boosted in cell B without disturbing the downlink transmission to UEs in cell A.

The above described embodiments of the present invention will be further explained by the following examples, denoted example 1 and example 2 as illustrated in FIG. 6. FIG. 6 shows a scenario with three cells, cell A, cell B and cell C. A first UE, UE1, is located in cell A, a second UE, UE2, is located in an area covered by both cells A and cell B and a third UE, UE3, is located in cell B. In the example, UE2 is handled by cell A, since its average path loss to cell A is less than the average path loss to cell B. Both examples relate to a downlink scheduling and link adaptation, assuming the following:

100 Physical Resource Blocks are allocated, e.g. a 20 MHz LTE carrier.

The RBS can transmit 100 W (50 dBm) in each cell.

The target output power is 1 W per PRB (30 dBm per PRB).

The target interference level in the system is −100 dBm per PRB. This can either be a predefined target or the result of averaging the interference level for a longer time period (e.g. many milliseconds).

The path loss has been derived based on any of the techniques described below, e.g. by combining the neighbour cell measurement reports and the CQI reports.

FIG. 6 shows the path loss for each UE to each of the three cells of the RBS, what has earlier been denoted the UE table. To simplify the example, the frequency dependency of the path loss is indicated by only three different values, for the low frequencies (PRB 0-32), the middle frequencies (PRB 33-65) and the higher frequencies (PRB 66-99). The number of values can easily be extended up to one value per PRB.

As can be send in FIG. 6, the UEs have less path loss to the cells they are served by than to the neighbouring cells.

Example 1

Concurrent Scheduling of Ue1 and Ue3

First, the UE1 is selected for scheduling. Based on the amount of data to transfer, the link adaptation selects the following combination:

Transmission on 30 PRB, Necessary C/I of 30 dB

Based on the target interference level of −100 dBm and the path loss of 90 dB (using PRB 70-99), the transmission power is selected to be 20 dBm per PRB.

The outcome of the scheduling of UE1 is thus that the PRB70-99 are used in cell A, with transmission power 20 dBm/PRB and an maximum acceptable interference level of −100 dBm. The cell table for cell A is updated with these values and that UE1 is scheduled in these PRBs.

Secondly, the UE3 is selected for scheduling. Before entering the link adaptation, the boundary conditions are determined:

Cell A generates 20 dBm/PRB output power in PRB70-99, which will generate an interference level of 20 dBm−120 dB=−100 dBm per PRB for UE3 since its path loss to cell A is 120 dB.

Cell A cannot tolerate an interference level of more than −100 dBm per PRB on PRB 70-99, and since the UE1 has 140 dB path loss to cell B, and at most −100 dBm+140=40 dBm per PRB is allowed to be transmitted in these PRBs.

Based on the amount of data to transfer, the link adaptation selects the following combination Transmission on 100 PRB, Necessary C/I of 35 dB.

Based on the target interference level of −100 dBm and the average path loss of 95 dB, the transmission power is selected to be 30 dBm per PRB. This is within the transmission power boundary.

The outcome of the scheduling of UE2 is thus that the PRB0-99 are used in cell B, with transmission power 30 dBm/PRB and a maximum acceptable interference level of −100 dBm per PRB. The cell table for cell B is updated with these values and that UE2 is scheduled in these PRBs.

The outcome is also that the noise margin of PRB70-99 of cell A is decreased to 0 dB since UE3 generates −100 dBm which is the target interference level. The noise margin of cell B is set to 0 dB for PRB70-99 since the improved C/I for PRB 67-99 was included in the average C/I needed. Alternatively, the noise margin can be set to 5 dB for PRB70-99 to indicate the available margin to average C/I. This will allow other users to be scheduled in these PRBs in other cells, as long as the interference level of the other PRBs is not reaching −100 dBm.

The example 1 has thus shown a scheduling scenario which is successful.

Example 2

Concurrent Scheduling of UE2 and UE3

First, the UE2 is selected for scheduling. Based on the amount of data to transfer, the link adaptation selects the following combination:

Transmission on 10 PRB, Necessary C/I of 10 dB

Based on the target interference level of −100 dBm per PRB and the path loss of 120 dB (using PRB 0-9), the transmission power is selected to be 30 dBm per PRB.

The outcome of the scheduling of UE2 is thus that the PRB0-9 are used in cell A, with transmission power 30 dBm/PRB and a maximum acceptable interference level of −100 dBm. The cell table for cell A is updated with these values and that UE2 is scheduled in these PRBs.

Secondly, the UE3 is selected for scheduling. Before entering the link adaptation, the boundary conditions are determined:

Cell A generates 30 dBm/PRB output power in PRB0-9, which will generate an interference level of 30 dBm−120 dB=−90 dBm per PRB for UE3 since its path loss to cell A is 120 dB.

Cell A cannot tolerate an interference level of more than −100 dBm per PRB on PRB 0-9, and since the UE2 has 120 dB path loss to cell B, at most −100 dBm+120=20 dBm per PRB is allowed to be transmitted in these PRBs.

Based on the amount of data to transfer, the link adaptation selects the following combination:

Transmission on 100 PRB, Necessary C/I of 35 dB.

The boundary conditions will cause the transmission to be done with different power on different PRBs:

For PRB 0-9: The interference caused by the UE2 is −90 dBm per PRB. With a 100 dB path loss and a maximum output power of 20 dBm, only 20 dBm−10 dB=−90 dBm=10 dB can be achieved.

This is far from the wanted 35 dB C/I and the PRBs will likely be omitted. The reduction of PRBs from 100 to 90 will increase the target C/I to 35.5 dB. For the remaining PRBs (PRB10-99), the target interference level is −100 dBm with no output power restrictions. The link adaptation can chose to transmit at −100 dBm+95 dB (path loss)+35.5 dB C/I=30.5 dBm per PRB.

The outcome of the scheduling of UE2 is thus that the PRB 10-99 are used in cell B, with transmission power 30.5 dBm/PRB and a maximum acceptable interference level of −100 dBm per PRB. The cell table for cell B is updated with these values and that UE2 is scheduled in these PRBs.

The outcome is also that the noise margin of PRB0-9 of cell A is left unused since cell B does not use these PRBs.

The example 2 has thus shown a scheduling scenario which is successful.

Hence, the benefit of the present invention is shown in example 2; If the boundary conditions would not have been calculated for UE3 link adaptation, the cell B would have transmitted on all 100 PRBs with an average output power of 30 dBm/PRB. This would have caused an interference at UE1 of −90 dBm and a corresponding C/I of 0 dB. The transmission to UE1 would therefore have failed. The transmission to UE1 would also have caused the C/I at PRB 0-9 for UE3 to be 20 dB, which would have lowered the probability of a successful transfer. As a worst case, both UE1 and UE3 would require retransmission, and thus significantly lowering the instantaneous capacity.

The disturbance caused in the neighbouring cells by a UE or radio base station transmission in cell A (in the first cell) can be estimated by using the scheduled transmission power and path loss to the receiver in the first cell. Different methods are exemplified below:

Statically calculated based on the antenna system configuration and nominal antenna patterns.

Estimate the path loss by use of UE neighbouring cell measurements reports such as downlink handover measurement reports (where the UE measures the power relation between the reference symbols in the two cells), and using reciprocity for the UL disturbance.

Estimate the path loss by using measured UL by demodulating at the radio base station the UE on signals received in multiple (or all) cells, and using reciprocity for the DL disturbance.

Estimate the path loss by comparing the scheduled transmission power in the second cell and the CQI reports by the UE in the first cell. This is further described below.

The DL interference at a UE caused by the transmission in other cells can be estimated by use of the UE reported pilot strength. This will result in a single value for the path loss from the radio base station to the UE. An improved method, which also allows for estimating the frequency dependency of the path loss, is to compare the history of the scheduled output power in a cell with the resulting CQI reports from the UE:

The radio base station stores the history of the scheduled power in each cell, and applies a corresponding filter as the UEs will.

The UE reports of the CQI are compared with the scheduled power.

As both the history and the CQI reports include values per frequency interval, an estimate of path loss per frequency interval (e.g. PRB) from each cell to the UE can be estimated. This is used as the estimate of path loss in the UE table for the corresponding UEs.

Correspondingly, the UL frequency dependency of the path loss can be estimated by comparing the scheduled uplink power, and the resulting interference level measurements in another cell receive antennas:

The radio base station stores the history of the scheduled UEs in each cell, and their scheduled uplink power.

The radio base station measures the uplink interference in each cell, and correlates this with the scheduled power.

This is then used in the UE table as an estimate of the path loss of the corresponding UEs. The comparison will allow a proper UL frequency dependent factor to be derived also in the case where the radio base station cannot decode all scheduled UEs on all receive antennas.

The above described method for estimating the frequency dependent path loss between different radio base station sectors and the UE can also be utilized to estimate the frequency dependent path loss between the UEs and neighbouring radio base stations.

The radio base stations then continuously send information to each other about the scheduled output power (e.g. average output power the last 100 ms per PRB) UL and DL. This will allow the radio base stations to better understand where to place the UEs UL transmissions to minimize the interference caused in the neighbouring cell and to initiate an HO due to UL path loss (and not only DL path loss as in current LTE system).

As explained above in conjunction with FIG. 2, the disturbance caused by transmission in the first cell by other transmissions within the first cell may be determined by the scheduled transmission power and by a model of the non-orthogonal properties of the transmission. The model may introduce noise in the adjacent frequencies proportional to the scheduled transmission power. Furthermore, the model may introduce noise in the directly following sub frame proportional to the scheduled transmission power.

Figure 7:
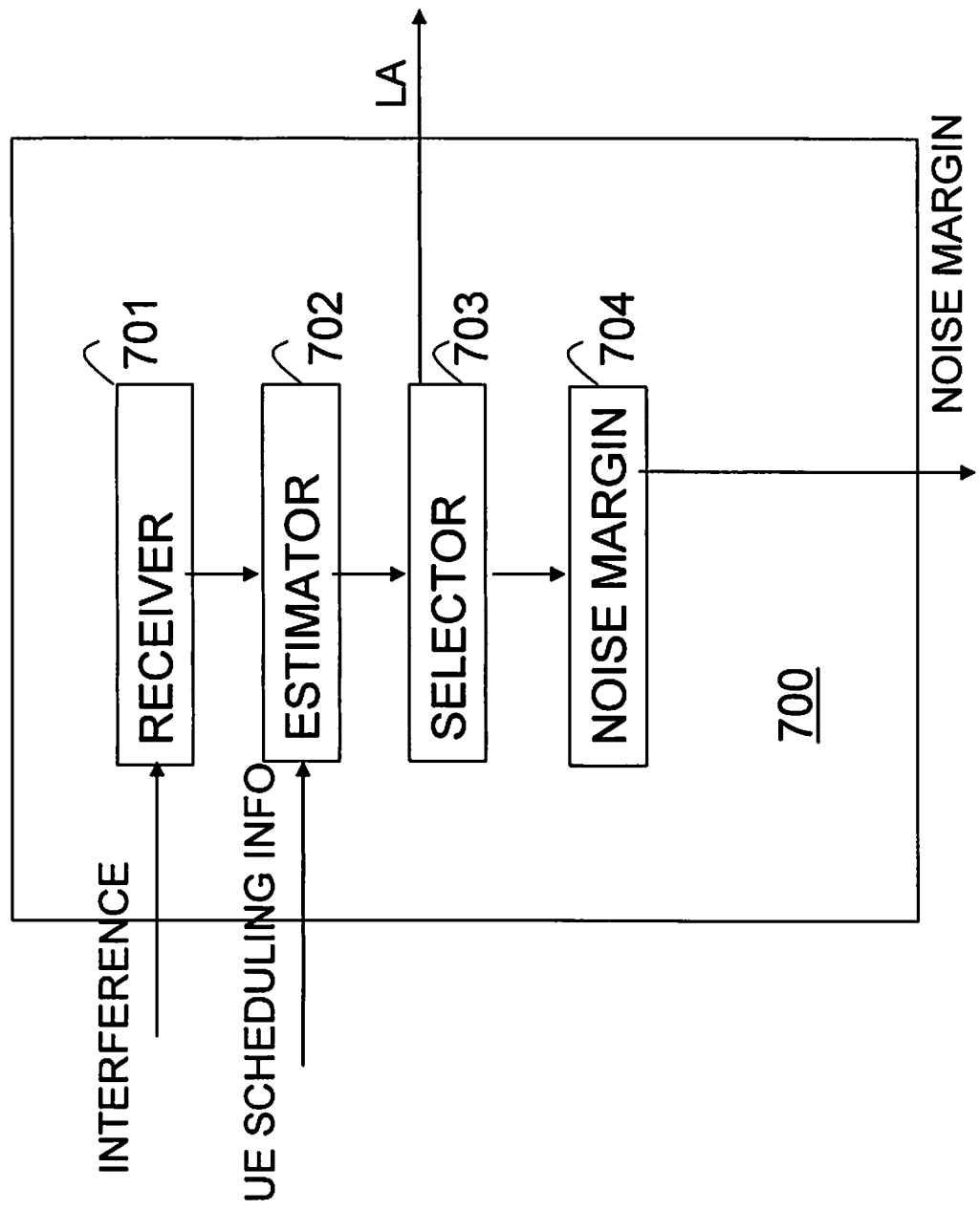
FIG. 7 illustrates schematically the arrangement according to an embodiment of the present invention.

Additionally, the present invention also relates to an arrangement for reducing interference in a cellular communication network as illustrated in FIG. 7. The arrangement 700 is used for uplink interference reduction according to some embodiments and for downlink interference reduction according to other embodiments. The arrangement 700 is configured to be implemented in a radio base station of a cellular communication network. Hence, the cellular communication network comprises a radio base station configured to serve at least a first cell, where interference is reduced by selecting a link adaptation scheme for a UE in the first cell. The arrangement 700 comprises means for receiving 701 measurements on estimated channel quality and means for estimating 702 channel quality for a future transmission by adjusting the received measurements on estimated channel quality based on knowledge of future UE scheduling in at least the first cell. Furthermore, the arrangement comprises means 703 for selecting the link adaptation scheme comprising a transmit power level based on the estimated channel quality for a future transmission.

According to an embodiment of the present invention, the radio base station is further configured to serve at least a second cell and the arrangement comprises then means for estimating is configured to estimate channel quality for a future transmission by adjusting the received measurements on estimated channel quality based on knowledge of future UE scheduling in at least the first cell and the second cell. In this way interference from other cells is also taken into account when estimating the channel quality for future transmissions.

In order to be able to perform sequential link adaptation in other cells the noise margin is introduced as described above. Hence, the arrangement according to an embodiment comprises means for determining 704 based on the selected link adaptation scheme a noise margin indicative of how much noise the receiver is allowed to experience in order to be able to keep the selected link adaptation scheme for each scheduled UE. The means for estimation of channel quality for a future transmission is further configured to determine disturbance caused by transmission in at least the second cell, and to determine disturbance caused by transmission in the first cell by other transmitters within the first cell. The selected transmit power is further used for sequential link adaptation of other transmissions, wherein the noise margin of the link adaptation is used as an upper boundary for sequential link adaptation of the other transmissions.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A method for reducing interference in a cellular communication network, wherein a radio base station of the network is configured to serve at least a first cell and a second cell, where interference is reduced by selecting a link adaptation scheme for a first UE in the first cell, the method comprising:
   receiving measurements on estimated channel quality;
   estimating channel quality for a future transmission by adjusting the received measurements on estimated channel quality based on knowledge of future UE scheduling that takes into account estimated disturbances to be caused by at least one other UE that is to be scheduled with the radio base station in at least the first cell and the second cell by:
      estimating disturbance in at least the second cell that is to be caused by future transmission performed in accordance with the future UE scheduling; and
      estimating disturbance in the first cell that is to be caused by future transmission from other transmitters within the first cell performed in accordance with the future UE scheduling;
   selecting the link adaptation scheme based on the estimated channel quality for the future transmission, the link adaption scheme comprising a coding rate, a modulation scheme, a transmit power level, and a MIMO (Multiple Input Multiple Output) mode;
   determining, based on the selected link adaptation scheme, a noise margin indicative of how much noise the first UE is allowed to experience in order to be able to keep the selected link adaptation scheme for each scheduled UE; and
   using the determined noise margin as an upper boundary for sequential link adaptation of other transmissions, where the selected transmit power level further is used for sequential link adaptation of other transmissions.

2. The method according to claim 1, wherein the interference in neighbouring cells to the at least the first cell and the second cell are taken into account when estimating channel quality for a future transmission.

3. The method according to claim 1, wherein a cell table for the first cell is maintained per resource block comprising radio base station power, noise margin for the scheduled UEs and identities of the scheduled UEs.

4. The method according to claim 3, wherein a UE table for each UE in the first cell is maintained per resource block comprising the path loss from at least the second cell.

5. The method according to claim 1, wherein the disturbance caused by transmissions in at least the second cell is determined based on the selected transmit power level and path loss from the at least the second cell to the first UE in the first cell.

6. The method according to claim 5, wherein the path loss is determined by UE neighbouring cell measurements reports.

7. The method according to claim 5, wherein the path loss is determined by comparing the selected transmit power level in the second cell and the CQI reports by the first UE in the first cell.

8. The method according to claim 5, wherein the path loss is determined by receiving the transmitted signal of the UE in the second cell by the radio base station of the first cell.

9. The method according to claim 1, wherein the disturbance caused to transmission in the first cell by other transmissions within the first cell is determined based on the selected transmit power level and by a model of the non-orthogonal properties of the transmission.

10. The method according to claim 9, wherein the model introduces noise in the adjacent frequencies proportional to the selected transmit power level.

11. The method according to claim 9, wherein the model introduces noise in the directly following sub frame proportional to the selected transmit power level.

12. An arrangement for reducing interference in a cellular communication network, wherein a radio base station of the network is configured to serve at least a first cell and a second cell, where interference is reduced by selecting a link adaptation scheme for a UE in the first cell, the arrangement comprising:
   means for receiving measurements on estimated channel quality;
   means for estimating channel quality for a future transmission by adjusting the received measurements on estimated channel quality based on knowledge of future UE scheduling in at least the first cell and the second cell, the future UE scheduling including at least one other UE that has been scheduled for which future transmissions have yet to be performed;
   means for selecting the link adaptation scheme based on the estimated channel quality for the future transmission, the link adaptation scheme comprising a transmit power level, a coding rate, a modulation scheme, and a MIMO (Multiple Input Multiple Output) mode; and
   means for determining, based on the selected link adaptation scheme, a noise margin indicative of how much noise the UE is allowed to experience in order to be able to keep the selected link adaptation scheme for each scheduled UE,
   wherein the means for estimating channel quality for a future transmission by adjusting the received measurements on estimated channel quality is further based on:
      determining disturbance in at least the second cell to be caused by future transmissions to be performed according to the future UE scheduling, and
      determining disturbance in the first cell to be caused by future transmissions of other transmitters performed according to the future UE scheduling,
   wherein the selected transmit power level further is used for sequential link adaptation of the other transmissions, wherein the noise margin of the link adaptation is used as an upper boundary for the sequential link adaptation of the other transmissions.

13. The arrangement according to claim 12, wherein the arrangement is configured to take the interference in neighbouring cells to the at least the first cell and the second cell into account when estimating channel quality for a future transmission.

14. The arrangement according to claim 12, wherein the arrangement is configured to maintain a cell table for the first cell per resource block comprising radio base station power, noise margin for the scheduled UEs and identities of the scheduled UEs.

15. The arrangement according to claim 14, wherein the arrangement is configured to maintain a UE table for each UE in the first cell per resource block comprising the path loss from at least the second cell.

16. The arrangement according to claim 12, wherein the arrangement is configured to determine the disturbance caused by transmissions in at least the second cell based on the selected transmit power level and path loss from the at least the second cell to the UE in the first cell.

17. The arrangement according to claim 16, wherein the arrangement is configured to determine the path loss by using UE neighbouring cell measurements reports.

18. The arrangement according to claim 16, wherein the arrangement is configured to determine the path loss by comparing the selected transmit power level in the second cell and the CQI reports by the UE in the first cell.

19. The arrangement according to claim 16, wherein arrangement is configured to determine the path loss by receiving the transmitted signal of the UE in the second cell by the radio base station.

20. The arrangement according to claim 12, wherein the arrangement is configured to determine the disturbance caused to transmission in the first cell by other transmissions within the first cell based on the selected transmit power level and by a model of the non-orthogonal properties of the transmission.

21. The arrangement according to claim 20, wherein the model is configured to introduce noise in the adjacent frequencies proportional to the selected transmit power level.

22. The arrangement according to claim 20, wherein the model is configured to introduce noise in the directly following sub frame proportional to the selected transmit power level.

23. An apparatus for managing interference in a cellular communication network that includes a radio base station configured to serve at least a first cell and a second cell, where a first UE is served by the first cell, the apparatus comprising:
   a processing system that includes at least one processor, the processing system configured to:
   determine disturbance in at least the second cell to be caused by future transmissions that are to be performed according to future UE scheduling;
   determine disturbance in the first cell to be caused by future transmissions from other transmitters within the first cell performed according to future UE scheduling;
   estimate channel quality for a future transmission, in accordance with the knowledge of future UE scheduling in at least the first cell and the second cell where the knowledge of future UE scheduling includes knowledge of how at least one other UE has been scheduled in the first or second cell, based on the determined disturbance in at least the second cell and the determined disturbance in the first cell;
   select the link adaptation scheme based on the estimated channel quality for the future transmission, the link adaption scheme including a transmit power level, a coding rate, a modulation scheme, and a MIMO (Multiple Input Multiple Output) mode;
   determine a noise margin indicative of how much noise a receiver is allowed to experience in order to be able to keep the selected link adaptation scheme for each scheduled UE in the future UE scheduling based on the selected link adaptation scheme; and
   use the determined noise margin of the link adaptation as an upper boundary for the sequential link adaptation of the other future transmissions.

* * * * *

UNITED STATES PATENT AND TRADEMARK OFFICE
CERTIFICATE OF CORRECTION

| | | |
|---|---|---|
| PATENT NO. | : 8,977,311 B2 | Page 1 of 1 |
| APPLICATION NO. | : 12/921480 | |
| DATED | : March 10, 2015 | |
| INVENTOR(S) | : Osterling et al. | |

It is certified that error appears in the above-identified patent and that said Letters Patent is hereby corrected as shown below:

On the Title Page, in Item (12), under "United States Patent", in Column 1, Line 1, delete "Osterling et al." and insert -- Österling et al. --, therefor.

On the Title Page, in Item (75), under "Inventors", in Column 1, Line 1, delete "Osterling," and insert -- Österling, --, therefor.

On the Title Page, in Item (75), under "Inventors", in Column 1, Line 1, delete "Jarfalla" and insert -- Järfälla --, therefor.

On the Title Page, in Item (75), under "Inventors", in Column 1, Line 2, delete "Jarfalla" and insert -- Järfälla --, therefor.

In the Specification

In Column 4, Line 15, delete "TN" and insert -- TTI --, therefor.

Signed and Sealed this
Twentieth Day of October, 2015

Michelle K. Lee
*Director of the United States Patent and Trademark Office*